United States Patent Office 2,927,593
Patented Mar. 8, 1960

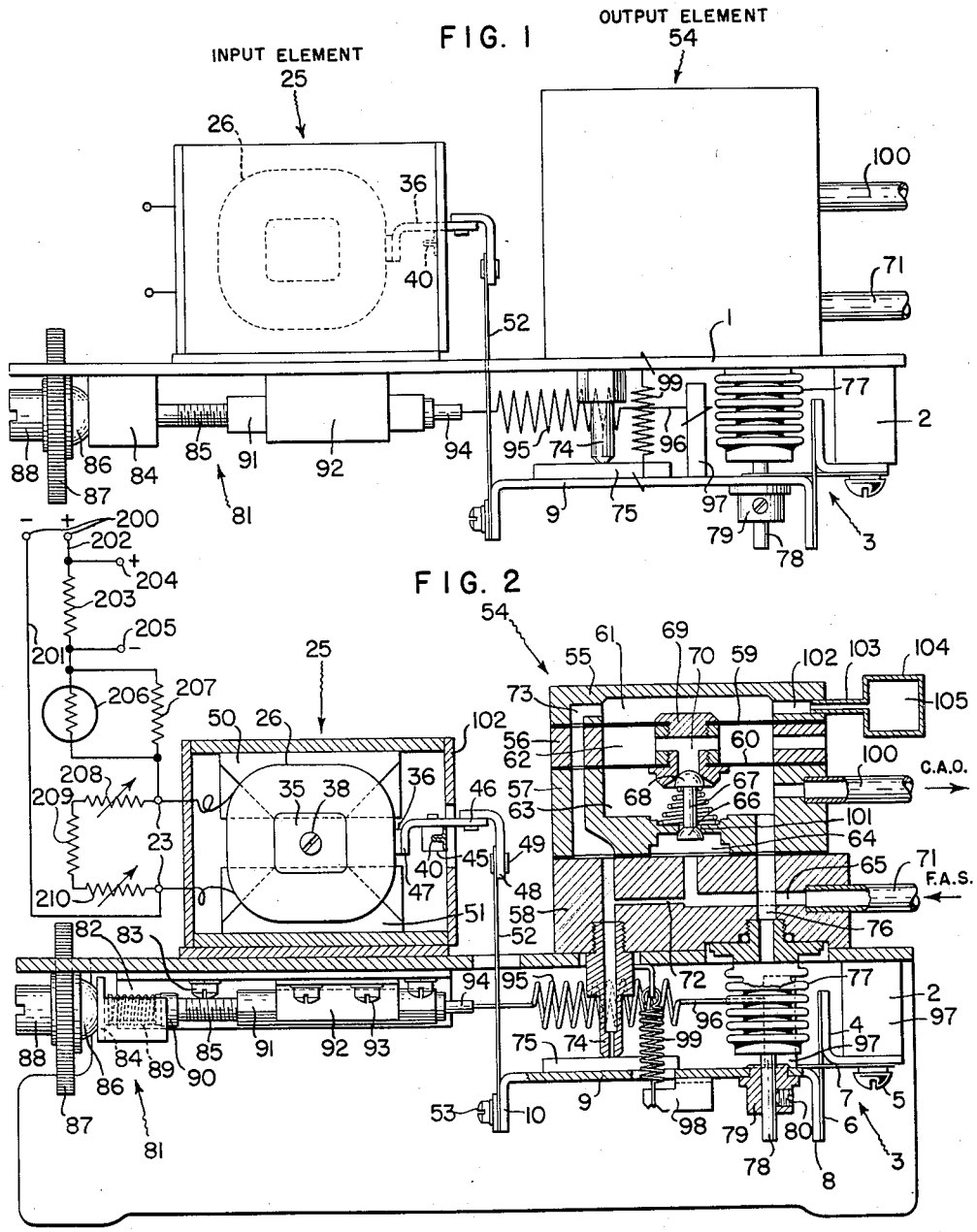

2,927,593

ELECTRIC-CURRENT TO AIR-PRESSURE
TRANSDUCER

Edward O. Hall and Roland H. Bates, Hatboro, Pa., assignors to Minneapolis-Honeywell Regulator Company, Minneapolis, Minn., a corporation of Delaware Application September 9, 1957, Serial No. 682,840

6 Claims. (Cl. 137—85)

This invention relates to transducers which are devices into which energy is put in one form and from which energy is taken out in the same or another form.

More specifically, this invention relates to a transducer having an input in the form of electric current and having an output in the form of air under pressure.

Many variables which it is desired to measure, indicate, record, and/or control are either small electric currents or can be converted to small electric currents by suitable, known, measuring instruments. Many final control elements are air-pressure-operated valves. Therefore, it is desired to provide a transducer which accepts an input in the form of a small electric current and which provides an output in the form of an air pressure in exact, linear proportion to the input of current.

A more specific object of my invention is to provide a current-to-pressure transducer having novel, manually operable means for adjusting the zero position thereof.

A better understanding of the present invention may be had from the following detailed description when read in connection with the accompanying drawings, in which:

Fig. 1 is a diagrammatic or schematic showing with parts displaced from their normal position for the sake of clarity.

Fig. 2 is a vertical, longitudinal, cross section together with an electric circuit diagram.

The input to the transducer of this invention is provided by small direct electric currents of the order of four to twenty milliamperes. These currents are provided by means (not shown) which are manually operable or operable by a measuring or controlling instrument.

Fig. 1 shows that the transducer of this invention comprises a chassis 1 on which is mounted the input element 25 which comprises a current-to-motion transducer. The minute electric input currents are fed to the input element 25 by means of the input terminals 23. The electric current applied to input element 25 causes a supporting arm 36 to rock about its pivot 40. The actuating force applied to supporting arm 36 is transmitted through strap 52 to the free end of a beam 9 which is mounted on a cross spring pivot, generally indicated 3.

The force transmitted through strap 52 to beam 9 moves flapper 75 relative to nozzle 74. This varies the flow of air through nozzle 74 and causes output element 54 to vary the pressure of the air in the controlled air outlet (C.A.O.) formed by output pipe 100. Output element 54 is a motion-to-air pressure transducer. The air under pressure in pipe 100 is fed to the final control element (not shown), such as an air-pressure-operated valve, which is to be controlled in accordance with the electric signal fed to input element 25.

The ouput air under pressure in pipe 100 is also fed to a feedback bellows 77 which is attached to beam 9 by means of bellows stem 78 and bellows retaining plate 79 which provide one means for adjusting the span of the device. The pressure of the air in the interior of feedback bellows 77 applies a force to beam 9 equal to and opposite in direction to the force which is applied to beam 9 from the input element 25. Therefore the pressure of the air within feedback bellows 77 causes beam 9 to stabilize at a new position in which the force applied by the input element 25 is balanced by the force of the pressure of the air in the feedback bellows 77.

The initial or zero or normal position of beam 9 is governed by means of a manually operable zero adjustment 81. Adjustment 81 comprises an adjusting screw 85 attached by a set screw to half-ball joint 86 and adjustable by means of disc 87 so as to vary the position of a sleeve nut 91 and thereby to vary the force which spring 95 exerts on beam 9 by means of pillar 97 which is attached to beam 9. The adjustment 81 is attached to chassis 1 by flange 84.

Fig. 2 shows the elements of the transducer of this invention in greater detail.

The input to the transducer is in the form of minute direct electric currents of the order of four to twenty milliamperes which are applied to the input terminals 200. The negative input terminal is connected through negative input lead 201 to one input terminal 23 of input element 25. The positive input terminal is connected through positive input lead 202, a fixed resistor 203, and a temperature-compensating device, to the other input terminal 23 of the input element 25. The temperature-compensating device comprises a thermistor 206 and a fixed resistor 207 connected in parallel with each other and each having a resistance of two hundred ohms.

The fixed resistor 203 connected in positive input lead 202 has a resistance of two and one-half ohms. A pair of instrument terminals 204 and 205 are connected to the ends of resistor 203 so that the input voltage or current can be read by means of a meter connected to instrument terminals 204 and 205.

A span adjustment is provided comprising: an adjustable resistor 208 of three thousand ohms resistance, a fixed resistor 209 of nineteen hundred ohms resistance, and an adjustable resistor 210 of two hundred ohms resistance. These resistors are connected in series across input terminals 23 of the input element 25. Resistors 208, 209, and 210 shunt or bypass a certain amount of electricity from passing through coil 26. This depends upon the amount of the adjustable resistor 208, which is the coarse adjustment, and the amount of the adjustable resistor 210, which is the fine adjustment, which are connected into the series connection in parallel with coil 26.

Input element 25 comprises a pair of input terminals 23 which are connected to a coil 26 wound on a suitable bobbin member 35 which may be formed of "Bakelite" or other suitable non-magnetic material. After the coil 26 has been wound on the bobbin 35, the coil may be impregnated with a suitable epoxy resin. A suitable resin may be "Araldite 115" which may be purchased commercially.

The bobbin 35 is carried by a supporting arm 36 which is mounted to the frame of input element 25 by means of a pivot 40. Bobbin 35 has a hole passing therethrough so that a screw 38 may be passed through the hole to engage suitable threading in the supporting arm 36. The pivoted supporting arm 36 is carried by a torsion angle pivot 40 which is formed of a resilient material and has a T-shaped cross section, as shown in Fig. 2. The outer ends of the torsion angle pivot 40 are firmly fastened to the frame of the input element 25. Mounting bar 45 serves as a connecting means to pivot 40 and arm 36.

The magnetic field for the input element 25 is produced by a plurality of permanent magnets 50 and 51 of which but two are shown in Fig. 2. Magnets 50 and 51 extend slightly beyond the vertical ends of coil 26 to insure that, when the coil 26 moves, it will remain within the magnetic field created by the permanent magnets. The faces of the magnets are shaped so as to concentrate the magnetic flux along the elongated sides of the coil 26.

When electric current is passed in through the input terminals 23 to the coil 26, current flowing through the coil will produce a flux field which reacts with the magnetic field produced by the permanent magnets. The coil 26 will be deflected at right angles to the principal flux field of the permanent magnets. Movement of the coil 26 is restricted because the arm 36 moves between the permanent magnets. In this apparatus the motion of the input element is restricted to approximately one quarter of one degree. This characteristic makes the apparatus very suitable for use in a transducer of the type of this invention wherein a high balancing force may be required on beam 9 while the actual motion of the beam is very small.

It will also be readily apparent that the apparatus is very rugged in construction in that the only moving part is the coil 26. There is no frictional problem in that the apparatus is supported by a torsion angle pivot which introduces substantially no loading on the apparatus over the small angle through which the device operates.

Input element 25 has a maximum of active material acting directly around the coil 26 which permits the obtaining of a high torque. By using the improved forms of "Alnico" magnets in the device, the overall size of the device may be considerably reduced so that the final device is very compact.

The rocking movement of supporting arm 36 about its pivot 40 is transmitted to the end portion 46 of supporting arm 36. End portion 46 is attached by means of flange 47 to one end of supporting arm 36. The opposite, free end of end portion 46 is connected by screws to bracket 48 which is connected by rivet 49 to one end of strap 52 which is connected, at its opposite end, by screw 53 to one end of flange 10 on beam 9.

Chassis 1 carries a cross spring pivot, generally indicated 3. This cross spring pivot comprises two pillars 2 on each of which is mounted an angle 4 to the opposite faces of which are attached one of the ends of each of four flat strips 6 and 7. The opposite ends of flat strips 6 and 7 are attached to flange 8 at one end of beam 9 and to the upper face of beam 9. Screws 5 secure angles 4 to pillars 2.

The output element, generally indicated 54, comprises a motion-to-air-pressure transducer including a pneumatic amplifier. A pilot valve or relay is made up of a case composed of a cap or top 55, a first ring 56, and a second ring 57 mounted on a manifold 58. First diaphragm 59 and second diaphragm 60 are mounted at their rims or perimeters between top 55 and ring 56 and between ring 56 and ring 57, respectively. Diaphragms 59 and 60 and valve seat 101 divide the interior of the pilot valve into four chambers.

Air is led from a filtered air supply (F.A.S.) through pipe 65 and restriction 72 to nozzle chamber 61 which communicates through nozzle conduit 73 with the interior of nozzle 74. Nozzle chamber 61 communicates through conduit 102 and pipe 103 with the chamber 105 in the interior of a hollow vessel 104. Vessel 104 may be of suitable size to provide a nozzle chamber 61 of any desired volume or capacity.

Flapper 75 is mounted on beam 9 so as to move into and out of engagement with the end of nozzle 4 and thereby to control the flow of air through nozzle 74.

Air is also led from filtered air supply (F.A.S.) through inlet conduit 65 to inlet chamber 64. Valve seat 101 has a perforation through the center of it. With the rim of this perforation cooperates an inlet valve 66, which is connected, by means of a valve stem 67, to movable exhaust valve 68, which cooperates with the rim of an exhaust port 70. Exhaust port 70 passes through connector 69 which is mounted in the centers of diaphragms 59 and 60. The opposite end of exhaust port 70 communicates with exhaust chamber 62 and thence with the surrounding atmosphere.

In the normal position of the pressure-output pilot-valve relay 54, the inlet valve 66 and the outlet valve 68 are both closed. Air is therefore trapped in the control-air-pressure chamber 63. The control-air-pressure within 63 is conducted through outlet pipe 100 to the final control valve or other final control elements (not shown).

The air under pressure in chamber 63 is also passed through bellows conduit 76 to bellows 77. The free end of bellows 77 carries bellows stem 78 which is attached by means of bellows retaining plate 79 and screw 80 to beam 9.

The span of the transducer can also be adjusted by moving manifold 58 and the parts carried thereby to the left or to the right as seen in Fig. 2. Such a movement varies the distance from the axis of cross spring pivot 3 to the center of nozzle 74 and therefore varies the amount of travel of flapper 75 relative to nozzle 74. Such a movement also varies the distance from the axis of cross spring pivot 3 to the center of bellows stem 78 and, consequently, varies the lever arm of feedback bellows 77 about pivot 3 and the effectiveness of the pressure in feedback bellows 77 on beam 9.

The initial or zero position of beam 9 may be manually adjusted by means of a zero adjustment generally indicated 81. This zero adjustment comprises a guide bracket 82 which is secured to chassis 1 by screws 83. Guide bracket 82 has a flange 84 through which passes adjusting screw 85 having on it a half-ball 86 which seats in the perforation in flange 84. Disc 87 is secured to first adjusting screw 85 and to half-ball 86 and has a knurled edge by means of which the adjusting screw 85 may be adjusted manually. Also the adjusting screw 85 may be adjusted by means of a screwdriver applied to screw head 88.

A small loading spring 89 bears, at one end, against flange 84 and, at its opposite end, against collar 90 secured to adjusting screw 85. Adjusting screw 85 has mating, screw threaded connection with sleeve nut 91.

Sleeve nut 91 has a portion of its outer surface flat and in sliding engagement with a flat surface of a guide plate 92 secured to chassis 1 by screws 93. An attachment 94 connects one end of sleeve nut 91 to one end of a large spring 95 which is secured, at its other end 96, to a pillar 97 mounted on beam 9.

Beam 9 also carries the hook 98 to which is secured one end of a bias spring 99 connected at its opposite end to chassis 1.

The operation of the transducer of this invention is as follows: When a variation occurs in the electric current applied to the input terminals 200 and thence to the input terminals 23, the current in coil 26 varies the flux field of coil 26, which flux field reacts with the magnetic field produced by the permanent magnets 50, 51. The coil 26 is therefore deflected at right angles to the principal flux field of the permanent magnets 50, 51. This force causes supporting arm 36 to transmit a torque about its pivot 40 and to transmit a force through strap 52 to the free end of beam 9 and thereby move beam 9 about its pivot 3 so as to vary the distance between flapper 75 and nozzle 74. This variation in the relationship between flapper 75 and nozzle 74 causes a variation in the pressure of the air in nozzle chamber 61.

When the pilot valve or relay 54 is in its normal or rest position, the pressure of the air in nozzle chamber 61 balances the pressure of the air in control-air chamber 63. Therefore, when the pressure of the air in chamber 61 varies, the diaphragms 59 and 60 move and cause inlet valve 66 or exhaust valve 68 to open while the other remains closed. Opening inlet valve 66 admits air to the chamber 63 while opening exhaust valve 68 permits the escape of air from chamber 63. When the pressure of the air in chamber 63 has returned to its predetermined relation to the pressure of the air in chamber 61, inlet valve 66 or exhaust valve 68 closes, and the air remains trapped in chamber 63.

The air in chamber 63 is fed through output pipe 100 to the final control valve or other final control elements (not shown). The pressure of the air in chamber 63 is also fed through bellows conduit 76 to the interior of bellows 77. Variation of the pressure of the air in the interior of bellows 77 applies a force to beam 9 and causes beam 9 to rock about its pivot 3 in the direction opposite to that in which the beam 9 was rocked by the input element 25 by the force applied by the input element 25 to the beam 9. These two forces, opposing each other, then hold the flapper 75 in its new position with respect to nozzle 74.

What is claimed is:

1. A transducer having an electric current input and an air pressure output, including in combination, a chassis, a cross spring pivot mounted on said chassis, a beam mounted for rocking movement on said cross spring pivot, an input element mounted on said chassis and comprising, input terminals, a coil connected to said input terminals, a supporting arm on which said coil is mounted, a bracket mounted on said chassis, a torsion angle pivot mounted on said bracket and carrying said supporting arm for rocking movement about said torsion angle pivot, at least one permanent magnet located so that said coil is within the magnetic field of said magnet, a strap connecting one end of said supporting arm of said input element to one end of said beam to cause said beam to rock about its pivot, an output element mounted on said chassis and comprising, a rigid case, a pair of diaphragms separating the interior of said case into three separate chambers comprising a nozzle chamber and an exhaust chamber and an output chamber, a perforated valve seat dividing the interior of said case into a fourth separate inlet chamber, a connector mounted on a movable portion of each of said diaphragms and having an exhaust port therethrough, an inlet valve controlling the communication between said inlet chamber and the output chamber, an exhaust valve cooperating with said exhaust port and controlling communication between said output chamber and said exhaust chamber, a spring biasing said valves so that but one of said valves can be opened at one time, a restriction adapted to be connected to a supply of compressed air and communicating with a nozzle chamber, a nozzle communicating with said nozzle chamber, a flapper mounted on said beam and cooperating with said nozzle to control the flow of air therethrough and thereby to control the output pressure of said output element, a bellows mounted on said chassis and connected at its free end to said beam and communicating interior to said output chamber so as to rock said beam in the direction opposite to that in which said beam is rocked by said input element, and means for adjusting the zero or initial position of said transducer comprising, a spring connected to said beam, a sleeve nut connected to the end of said spring opposite to said beam, a screw having thread engagement with said sleeve nut, and manually operable means for adjusting said screw relative to said sleeve nut to vary the tension of said spring.

2. A transducer, including, an input element operated by electric current, an output element operated by air pressure, a pivotally mounted beam rocked about its pivot in one direction by said input element and rocked about its pivot in the opposite direction by said output element, means operable by the rocking movement of said beam controlling the change in pressure of the air in said ouput element, and means for adjusting the zero or initial position of said beam comprising a spring connected at one end to said beam, a pair of screws one of which is connected to the opposite end of said spring from said beam, means holding one of said screws against rotary movement, manually operable means imparting rotary movement to the other of said screws so as to vary the tension which said spring exerts on said beam, and a second spring biasing said screws into engagement with one another.

3. In a device for translating a first form of energy into a second form of energy including a balanced member, manually operable means for adjusting the initial or zero position of the balanced member, including, a bias spring secured to said member and biasing it for movement in one direction, a large spring biasing said member for movement in the opposite direction, a pair of elements having screw threaded engagement with each other and connected at one portion to a portion of said large spring and connected at another portion to said device, and means for rotating said screw threaded members relative to each other so as to adjust the tension which said large spring exerts on said balanced member.

4. In a device for translating an electric energy signal into a fluid pressure signal including a force-balance beam, manually operable means for adjusting the initial or zero position of said force-balance beam, including, a bias spring connected to said device and to said beam so as to move said beam in one direction, a large spring connected at one portion to said beam, a sleeve nut connected to a portion of said large spring spaced from the connection between said large spring and said beam, guides on said device controlling the movement of said sleeve nut, an adjusting screw having screw threaded engagement with said sleeve nut, a guide bracket mounting said adjusting screw for rotary movement on said device, and a disc secured to said adjusting screw and serving to provide means for manually rotating said adjusting screw to vary the tension of said large spring.

5. In a transducer of electrical energy including a pivotal mounted force-balance beam, manually operable means for adjusting the initial or zero position of said force-balance beam, including, a bias spring secured to said device and to said beam and biasing said beam for movement in one direction, a large spring secured to said beam and biasing said beam for movement in the opposite direction, a sleeve nut secured to a portion of said large spring spaced from the connection between said large spring and said beam, said sleeve nut having a flat face, a guide plate secured to said transducer and engaging with the flat face of said sleeve nut to provide a guide for movement of said sleeve nut, an adjusting screw having screw threaded engagement with said sleeve nut, a guide bracket providing a mounting for said adjusting screw for rotary movement, and a disc forming part of said adjusting screw and providing means for manually rotating said adjusting screw and thereby moving said sleeve nut and adjusting the tension which said large spring exerts on said beam.

6. In a transducer having an electric current input and an air pressure output and including, a beam mounted for rocking movement on a pivot on said transducer, means for adjusting the zero or initial position of said beam, including, a spring connected to said beam so as to bias said beam for movement in one direction, a pair of screws, one of which is mounted to a portion of said spring spaced from the connection between said spring and said beam, means holding one of said screws against rotary movement, a bracket mounting the other of said screws on said transducer for rotary movement, manually operable means imparting rotary movement to said other of said screws so as to vary the tension which said spring exerts on said beam, and a second spring biasing said screws into engagement with one another.

References Cited in the file of this patent

UNITED STATES PATENTS

| | | |
|---|---|---|
| 2,088,185 | Borde | July 27, 1937 |
| 2,298,112 | Edwards et al. | Oct. 6, 1942 |
| 2,789,543 | Popowsky | Apr. 23, 1957 |